United States Patent Office

3,091,514
Patented May 28, 1963

3,091,514
PRODUCTION OF DEAD BURNED MAGNESIA
Earl Leatham, Wexford, and Albert H. Pack, Pittsburgh, Pa., assignors to Harbison-Walker Refractories Company, Pittsburgh, Pa., a corporation of Pennsylvania
No Drawing. Filed Mar. 17, 1961, Ser. No. 96,375
7 Claims. (Cl. 23—201)

This invention relates to the manufacture of dense dead burned magnesia particularly adapted for use as a refractory material.

Dead burned magnesia is one of the principal materials used in the manufacture of basic refractory products including what are termed magnesite brick, bonding mortars, ramming and casting mixes, and related products in which the dead burned magnesia may be used either alone or blended with chrome ore or other compatible materials. Dead burned magnesia is made by firing a magnesia source, such as magnesium hydroxide, at a temperture of at least about 2700° F., and most suitably at 3200° F. or higher.

A variety of sources of magnesia for making the dead burned product are available. Among them are magnesium hydroxide derived by adding lime, customarily in the form of calcined dolomite, to sea water, and various magnesium-contained bitterns or brines, such as Dead Sea water or brines from deep wells, and from brines resulting from the recovery of potassium chloride from carnallite. Although burning of magnesium hydroxide from such sources will effect dead burning, experience has shown that the resultant dead burned grain has a bulk specific gravity, for instance an average of about 2.90, that is too low to give high grade refractory products because in consequence of the low specific gravity the products do not possess desired low porosity and maximum density.

It is among the objects of this invention to provide a method of providing from magnesia sources containing magnesium chloride dead burned magnesia of higher bulk specific gravity than has been produced heretofore from such materials, which method is simple and easily practiced with readily available standard equipment.

A further object is to provide such a method that is applicable to magnesias containing other water soluble chlorides in addition to magnesium chloride.

A special object is to provide dead burned magnesia of bulk specific gravity of at least 3.0 and preferably 3.1 or greater.

Other objects will be recognized from the following specification.

The term "calcined" as used herein has reference to magnesia that has been heated to a temperature, for instance of the order of 1700° to 2200° F., to produce what is known as caustic magnesia, in which form it is hydratable.

Magnesia sources used in the practice of this invention are brines containing at least about 20 grams of $MgCl_2$ per liter. A variety of such brines are available, examples being Dead Sea water, end brine resulting from the extraction of potassium chloride from carnallite, deep well brines, and bitterns, either natural or concentrated by solar evaporation. Typical Dead Sea brine and carnallite end liquor contain, respectively, about 160 grams per liter and 350 grams per liter of $MgCl_2$.

It is known that $MgCl_2$ can be converted at relatively low temperatures to MgO and HCl so that such brines, of which large amounts are available, form a potential source of magnesia for dead burning. When these brines are heated in conventional apparatus such as rotary kilns or reverberatory furnaces the effect of concentration is eventually to produce $MgCl_2.6H_2O$ which under heat liquefies, undergoes partial decomposition and solidifies. In consequence it is not practical or economical to produce MgO in that way.

In accordance with this invention such brines are converted to MgO by a special procedure, the MgO is briquetted, and the briquettes are dead burned. More specifically, the brine is flash dried and calcined by spraying or atomizing it in the upper end of a vertical tower while passing upwardly a heated gas in an amount and at a temperature relative to the sojourn of the brine particles in the tower to effect conversion of the $MgCl_2$ to MgO and HCl. The gas must be hot enough not only to decompose the $MgCl_2$ but also to calcine the MgO produced. The gases carrying the water vapor and HCl are withdrawn from the upper end of the tower for recovery of hydrochloric acid, if desired, and the calcined MgO is withdrawn from the lower end of the tower.

The calcined magnesia thus produced is then briquetted and dead burned to at least 2700° F. and most suitably at 3200° F. or higher. We have thus produced dead burned MgO at 3140° F. of 3.17 bulk specific gravity.

MgO produced in the manner described and $Mg(OH)_2$ made from sea water tend to contain a small amount, of the order of a few percent by weight, of residual $MgCl_2$. Although this residual $MgCl_2$ will be decomposed during dead burning, we have found that dead burned MgO of superior density is obtained by removing the residual $MgCl_2$ before dead burning.

In a further embodiment of the invention, then, the magnesia source, whether magnesium hydroxide from sea water or other brines, or magnesia made by the flash calcining procedure described above, is first washed with water to remove residual magnesium chloride, following which the material is calcined to get rid of free water and water of hydration, which may be accomplished at about 1700° to 1800° F., to produce a magnesia calcine that is hydratable. The calcined material is then briquetted and fired to effect dead burning as described above. We find that in this way the dead burned product will have superior bulk specific gravity, for instance 3.32, compared with dead burned magnesia of about 3.1 bulk specific gravity made from the same starting material in the same way but without the initial water washing.

The calcining operation effects a partial densification of the magnesia. Experience has shown that hydration of the caustic calcined magnesia, even to a slight extent, causes some loss of density so that upon dead burning the product is not of optimum bulk specific gravity. In the preferred embodiment of the invention steps are taken to avoid such decrease in density due to hydration of the caustic magnesia, and thereby to obtain maximum bulk specific gravity, in the manner now to be described.

The calcination of the washed magnesia is conducted for such a time and at such a temperature as to remove all of the free, and all or substantially all, of the chemically combined water, but short of a temperature that will cause dead burning. At this stage the calcined magnesia is hydratable if the calcination is effected at between about 1700° to 2200° F., suitably 1800° F. In accordance with this practice of the invention, and in order to produce dead burned product of maximum bulk specific gravity, the calcined product is handled in accordance with the procedure described in Serial No. 847,864, filed October 22, 1959, now United States Patent No. 3,060,000, which is owned by the assignee of the present application. Thus it is maintained at a high temperature up to initiation of the dead burn firing. To this end the material is discharged from the calciner above about 600° F., and suitably higher, even as high as 2000° F. Without intermediate cooling this hot material is subjected to compression to form small compressed shapes under a pressure of at least about 20,000 pounds per square inch.

Although there is nothing critical in the shape and size of these shapes, they should be relatively small, for instance about 1½ x ¾ x ⅝ inch. The still highly heated compressed shapes are then subjected to briquetting under a pressure of at least about 20,000 pounds per square inch. These briquettes should likewise be relatively small, say 1½ x ¾ x ⅝ inch. Final densification is effected by passing the still highly heated briquettes to a kiln for dead burning in which temperatures of about 3500° F. and higher, say 3700° F., are attainable so that the briquettes will be heated to at least about 3000° to 3200° F. In this way we find that we can produce dead burned product having a bulk specific gravity approaching the theoretical value of 3.58. Such products are especially desirable for the production of basic refractory shapes.

Some magnesias produced from brines of the types mentioned above may contain other water soluble chlorides, such as those of sodium, potassium and calcium. These will likewise be removed by the operation by which the objectionable magnesium chloride is eliminated.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. In a method of making dense dead burned magnesia from a magnesium chloride brine containing at least about 10 grams of $MgCl_2$ per liter, the steps comprising spraying the brine into the upper end of a tower while passing upwardly a heated gas inert to magnesia, the gas being at a temperature between about 1700° and 2200° F. in an amount such that in passing through the tower the $MgCl_2$ of the brine is decomposed to HCl and caustic calcined MgO from which all free and substantially all chemically combined water are driven off, briquetting the caustic calcined magnesia, and thereafter heating the briquettes to at least about 2700° F. and thereby producing dense dead burned magnesia.

2. A method according to claim 1, said brine being a Dead Sea brine.

3. A method according to claim 1, said brine being end liquor from recovery of potassium chloride from carnallite.

4. In a method of making dense dead burned magnesia from a magnesium chloride brine containing at least about 10 grams of $MgCl_2$ per liter, the steps comprising spraying the brine into the upper end of a tower while passing upwardly a heated gas inert to magnesia, the gas being at a temperature between about 1700° and 2200° F. and in an amount such that in passing through the tower the $MgCl_2$ of the brine is decomposed to HCl and caustic calcined MgO from which all free and substantially all chemically combined water are driven off, washing the resultant MgO with water to remove residual chloride, again caustic calcining the washed material to drive off combined and free water and produce hydratable caustic calcined magnesia, briquetting the caustic calcined magnesia, and thereafter heating the briquettes to at least about 2700° F. and thereby producing dense dead burned magnesia.

5. In a method of making dense dead burned magnesia from a magnesium chloride brine containing at least about 10 grams of $MgCl_2$ per liter, the steps comprising spraying the brine into the upper end of a tower while passing upwardly a heated gas inert to magnesia, the gas being at a temperature between about 1700° and 2200° F. and in an amount such that in passing through the tower the $MgCl_2$ of the brine is decomposed to HCl and caustic calcined MgO from which all free and substantially all combined water are driven off, washing the resultant MgO with water to remove residual chloride, again caustic calcining the washed material at a temperature between about 1700° to 2200° F. to produce hydratable caustic calcined magnesia, forming the caustic calcined material into small compressed shapes under a pressure of at least 20,000 pounds per square inch, briquetting the compressed shapes at a pressure of at least 20,000 pounds per square inch, and thereafter heating the briquettes to at least about 2700° F. and thereby producing dead burned magnesia.

6. In a method of making dense dead burned magnesia from a magnesium chloride brine containing at least about 10 grams of $MgCl_2$ per liter, the steps comprising spraying the brine into the upper end of a tower while passing upwardly a heated gas inert to magnesia, the gas being at a temperature between about 1700° and 2200° F. and in an amount such that in passing through the tower the $MgCl_2$ of the brine is decomposed to HCl and caustic calcined MgO from which all free and substantially all combined water are driven off, washing the resultant MgO with water to remove residual chloride, again caustic calcining the washed material at a temperature between about 1700° to 2200° F. to produce hydratable caustic calcined magnesia, discharging the caustic calcined material at a temperature not below about 600° F., briquetting the hot caustic calcined material at a pressure of at least 20,000 pounds per square inch, and thereafter heating the still heated briquettes to at least about 2700° F. and thereby producing dead burned magnesia.

7. In a method of making dense dead burned magnesia from a magnesium chloride brine containing at least about 10 grams of $MgCl_2$ per liter, the steps comprising spraying the brine into the upper end of a tower while passing upwardly a heated gas inert to magnesia, the gas being at a temperature between about 1700° and 2200° F. and in an amount such that in passing through the tower the $MgCl_2$ of the brine is decomposed to HCl and caustic calcined MgO from which all free and substantially all combined water are driven off, washing the resultant MgO with water to remove residual chloride, again caustic calcining the washed material to drive off combined and free water and produce hydratable magnesia, discharging the caustic calcined material at a temperature not below about 600° F., forming the hot caustic calcined material into small compressed shapes under a pressure of at least 20,000 pounds per square inch, briquetting the hot compressed shapes at a pressure of at least 20,000 pounds per square inch, and thereafter heating the still heated briquettes to at least about 2700° F. and thereby producing dead burned magnesia.

References Cited in the file of this patent

UNITED STATES PATENTS

| | | |
|---|---|---|
| 2,155,119 | Ebner | Apr. 18, 1939 |
| 2,281,477 | Chesny | Apr. 28, 1942 |
| 2,413,292 | Christensen | Dec. 31, 1946 |
| 2,478,593 | Pike | Aug. 9, 1949 |
| 2,640,759 | Hughey | June 2, 1953 |
| 2,695,242 | Woodward | Nov. 23, 1954 |
| 2,957,752 | Gloss | Oct. 25, 1960 |
| 3,060,000 | Snyder et al. | Oct. 23, 1962 |

FOREIGN PATENTS

| | | |
|---|---|---|
| 527,139 | Great Britain | Oct. 2, 1940 |

OTHER REFERENCES

"Chemical and Raw Materials," by R. K. Gitlin, August 1956 (Chemical Engineering), pp. 142 and 144.